United States Patent [19]

Jacobson

[11] Patent Number: 4,494,333
[45] Date of Patent: Jan. 22, 1985

[54] FISHING ROD HANDLE WITH REEL SEAT

[76] Inventor: Hubert B. Jacobson, 1137 Pennsylvania Ave., Plymouth, Ind. 46563

[21] Appl. No.: 505,362

[22] Filed: Jun. 16, 1983

[51] Int. Cl.³ .............................................. A01K 87/06
[52] U.S. Cl. ............................................. 43/22; 43/23
[58] Field of Search ................... 43/22, 23, 18.1, 18.5

[56] References Cited

U.S. PATENT DOCUMENTS

| 3,123,931 | 3/1964 | Stephens | 43/22 |
| 3,522,674 | 8/1970 | Hardesty | 43/22 |
| 4,222,192 | 9/1980 | Jacobson | 43/22 |
| 4,237,640 | 12/1980 | Sato | 43/22 |

Primary Examiner—Nicholas P. Godici
Assistant Examiner—C. McKee
Attorney, Agent, or Firm—Woodard, Weikart, Emhardt & Naughton

[57] ABSTRACT

A fishing rod handle reel seat inside the handle has a first cavity near the front of the handle. A second cavity behind the first opens through the wall of the handle. A movable closure covers this opening. A slide portion has edge-located ribs received in guide grooves in the handle. An unribbed portion is hinged to the ribbed portion and can be pulled outward to a position transverse to the rod handle for use as a slide handle to push and pull the slide between cavity-opening and cavity-covering positions to enable the installation or removal of a reel.

10 Claims, 8 Drawing Figures

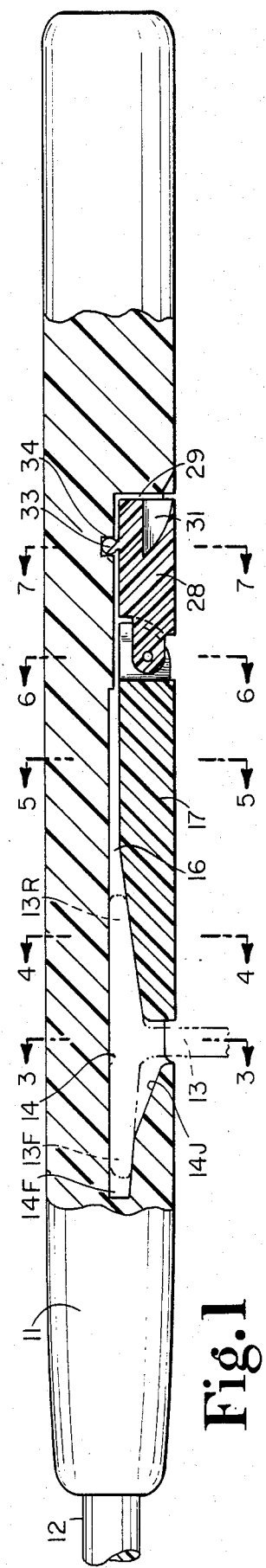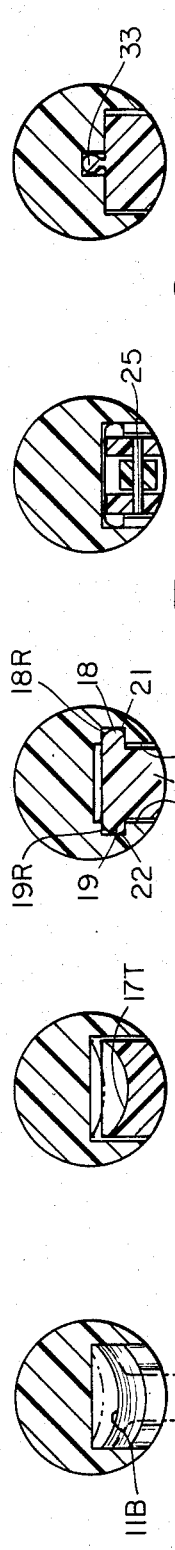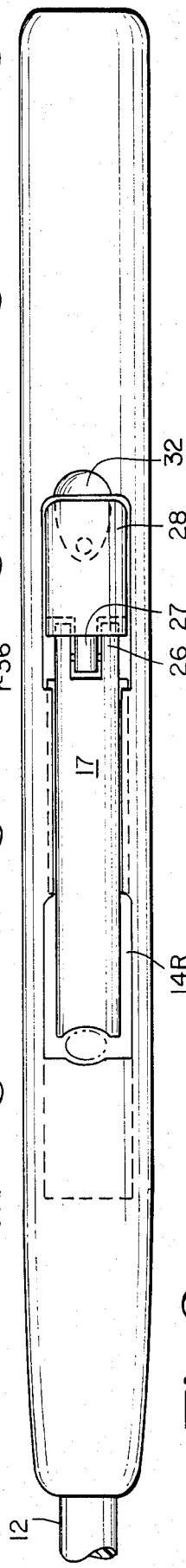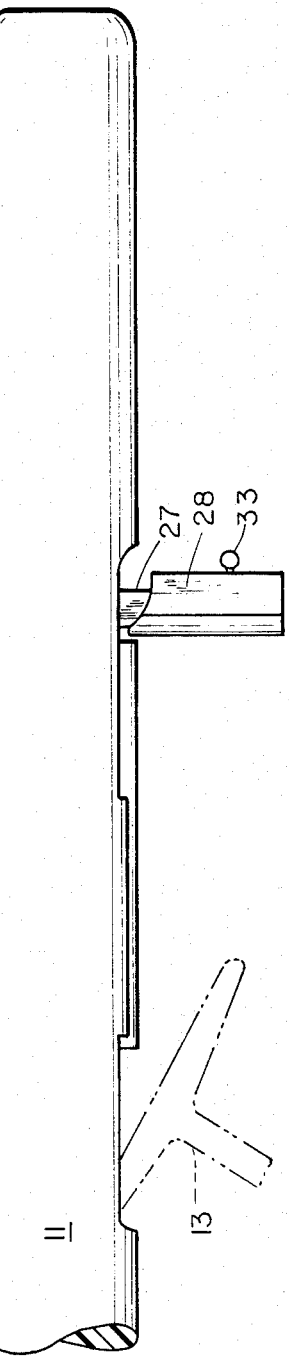

4,494,333

FISHING ROD HANDLE WITH REEL SEAT

BACKGROUND OF THE INVENTION

1. Field of the Invention

This invention relates generally to fishing rods, and more particularly to reel seating and securing means in the rod handle.

2. Description of the Prior Art

A general description of the prior art appears in my U.S. Pat. No. 4,222,192 issued Sept. 16, 1980. That patent disclosed a handle structure in which there was essentially no discernable interruption in the surface of the handle at the location of the mounting of the reel. It did require removal of a handle end cap to enable a slide member to move enough to provide sufficient opening to permit installation or removal of the reel. For some reels and some sizes of rod handles and reel feet, it could require complete removal of the slide and reel foot through the end of the handle. This could cause some inconvenience in necessitating care to keep control and thereby avoid loss of loose parts such as the end cap and slide, while changing reels.

In addition to various rods or handles mentioned in my prior patent, there is a rod offered by Shakespeare Fishing Tackle Division and called the "Ugly Stick XL" and which appears to use a screw clamp having a partially concealed thumbwheel screw to secure the reel to the rod in a somewhat inconspicuous way. However it does not very well avoid the interruption in the handle which is typical of fishing rods and which my inventions are intended to minimize. Therefore it is an object of this invention to provide a handle with a reel seat construction which achieves this main goal of minimizing interruptions in the handle, surface while at the same time avoiding any loose parts during the change of reels.

SUMMARY OF THE INVENTION

Described briefly, according to a typical embodiment of the present invention, a handle is provided with a reel seat inside the handle and which has a first cavity which is normally located toward the front of the handle. The forward foot of the reel mounting base is inserted into this cavity. This cavity joins a second cavity which is open at the handle surface, and located behind the first cavity. There is sufficient opening in the wall of the handle at this second cavity to insert first the front and then the rear foot of the reel base. A closure is provided to cover this opening. The closure is unusual in several respects. It has a front portion which is a slide, having ribs in the edges and which are received in guide grooves in the handle adjacent the second cavity. It also has a rear portion without the rib and which can be pulled outward to a position transverse to the rod handle. This rear portion can be used as a handle to pull and push the slide between cavity-covering and cavity-opening positions. Means are provided to hold the rear portion in a position where it is smooth and flush with the rest of the exterior of the rod handle when it is not being used to open the cavities to enable the installation or removal of a reel.

BRIEF DESCRIPTION OF THE DRAWINGS

FIG. 1 is a partially sectioned side elevational view of a fishing rod handle with reel seat according to a typical embodiment of the present invention, with the reel feet on a T-shaped fishing reel support securely seated therein.

FIG. 2 is a bottom plan view thereof.

FIG. 3 is a cross section taken at line 3—3 in FIG. 1 and viewed in the direction of the arrows FIG. 4 is a cross section taken at line 4—4 in FIG. 1 and viewed in the direction of the arrows.

FIG. 5 is a cross section taken at line 5—5 in FIG. 1 and viewed in the direction of the arrows.

FIG. 6 is a cross section taken at line 6—6 in FIG. 1 and viewed in the direction of the arrows.

FIG. 7 is a cross section taken at line 7—7 in FIG. 1 and viewed in the direction of the arrows.

FIG. 8 is a fragmentary side elevational view thereof during operation thereof to mount or dismount a reel.

DESCRIPTION OF THE PREFERRED EMBODIMENT

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the fishing rod handle 11 receives the butt end of a fishing rod 12 in the front end thereof. A fishing reel support 13 of the T-type is shown in phantom, with the front reel foot 13F received in a forward cavity 14 in the handle. The rear reel foot 13R is received in a middle cavity 16 in the handle. These two cavities communicate with each other but are separately identified to facilitate the description.

The reel support is retained in place by a slide 17 which covers the cavity 16. As best shown in FIG. 5, this slide has a pair of ribs or rails 18 and 19 received in longitudinally extending grooves 21 and 22 in the handle at each side wall of the cavity 16. The side walls 23 and 24 of cavity 16 adjacent the slide 17 are very close to the sides of the slide 17 so that the transition from the outer surface of the handle to the outer surface of the slide is barely perceptible.

The slide has a yoke portion 26 at its rear end and which receives the tongue 27 of a slide operator handle 28. These are pinned together by a pin 25 so that the operator handle 28 is pivotable outward from the rod handle to the position shown in FIG. 8. The slide operator handle 28 is normally received in a third cavity 29 of the handle which is behind and communicates with the intermediate cavity 16. The opening of this cavity 29 at the outer surface of the handle is wider than that of the cavity 16 but, as is true of the slide and its relationship to the opening of cavity 16, the slide handle sidewalls are very close to the sidewalls of the cavity 29, so the transition from the rod handle to the outside of the slide handle at the outer surface is barely perceptible when the slide handle is folded, as shown in FIGS. 1 and 2.

A notch 31 is provided in the rear end of the slide handle 28. A shallow notch 32 is provided in the outer surface of the rod handle adjacent notch 31 to accommodate reception of a thumbnail or fingernail of the fisherman to enable pulling out the slide handle. A latch knob 33 is received in detent 34 in cavity 29. A snug fit of the knob in the detent retains it securely when closed or folded, as shown in FIGS. 1 and 2. For this purpose, the knob can be of a resilient material such as plastic received in a slightly less resilient material in the handle. Other latching means may also be used. One example is a "Dot" snap fastener.

As suggested above an advantage of this handle construction over that in my prior patent is the fact that it enables the avoidance of loose parts while the reel is being installed or removed. In the illustrated embodiment, it also enables the use of a relatively wide reel foot, wider than the slide 17, without the necessity of pulling the reel foot all the way out the end of the rod. For this purpose the open wall portion 14R at the rear of cavity 14, behind the stem of the reel support is as wide as the span of the ribs or rails 18 and 19 on the slide 17. Accordingly, this additional width is available for mounting the reel and leaving only a very small gap in the uniform outer surface of the handle when the slide is closed. At the same time, the rails extend far enough toward the front (rod-end) of the handle to provide secure clamping support of the rear reel foot in cavity 16 when the slide is closed. Also, when the slide is moved to the rear, there is sufficient amount of rail in the slide mounting and guide grooves 21 and 22, to retain the slide in the handle without concern that it will fall out during removal or installation of a reel.

For a rod where the size of the handle and width of the opening between walls 23 and 24 of cavity 16 are ample for the width of reel feet which might be used, the walls can extend entirely up to the location of the stem of the reel support and thus be flush with the slide for its entire length. In this instance, the ribs 18 and 19, and receiver grooves 21 and 22 in the handle, can be likewise extended forward to a point immediately adjacent the opening for the stem. The cavity 14F has an inclined portion 14J adjacent the reel support stem to facilitate entry and withdrawal of the front reel foot with a very minimal rearward movement thereof as accommodated when the slide is opened to uncover the cavity portion 14R.

As shown in FIG. 1, the bottom of cavity 14 and top of slide 17 are tapered to wedgingly fill the reel feet. As shown in FIGS. 3 and 4, they are also concave to fit as at 17T on the slide in FIG. 4 and 11B designating the lower front wall of cavity 14 in FIG. 3.

The rod handle, slide portion, and slide handle portion may be made of molded plastics. The ribs 18 and 19 can have curved inner (upper edges) 18R and 19R respectively. This together with some resilience in the material of the slide and in the cavity walls 23 and 24, enables snapping the slide into position in the direction of arrow 36 (FIG. 5) for original assembly of the slide in the rod handle. It will not come out in the same way, because the opposite (lower) edges of the ribs are not rounded.

From the foregoing description, it should be apparent that the present invention may be used beneficially in several types of rod handles. In some instances it may be found desirable to have the slide and operating handle for it in front of, rather than behind, the reel seat. Such an arrangement should be considered reasonably within the scope of the claims hereinafter and, in that event, the expressions "forward" and "rear" may be interpreted in the opposite sense.

While the invention has been illustrated and described in detail in the drawings and foregoing description, the same is to be considered as illustrative and not restrictive in character it being understood that only the preferred embodiment has been shown and described and that all changes and modifications that come within the spirit of the invention are desired to be protected.

What is claimed is:

1. A fishing rod handle with improved reel seat and comprising:
   an elongate body member having a forward end and a rear end, said body member having a generally round cross section to facilitate gripping and holding in a hand, the forward end of the body member being adapted to receive a rod thereon;
   an opening in the outer surface of said body member and communicating with a first cavity in the body member,
   said first cavity extending in one direction from said opening;
   a closure in said opening,
   said closure including a slide portion and a handle portion, the handle portion being movable out of a position substantially flush with the said outer surface and into a position transverse to the longitudinal direction of said body member, to facilitate operation of said slide portion.
2. The handle of claim 1 wherein:
   said slide portion is hinged to said handle portion.
3. The invention of claim 2 and further comprising:
   retainer means on said body member and said handle portion and normally holding said slide portion in said closed folded, flush relationship with said outer surface.
4. The invention of claim 1 wherein:
   said body member and said slide portion having mating guide means at the sides of said opening whereby said slide portion is guidingly retained in said handle as said opening is partially uncovered by sliding said slide toward and end of said opening opposite the end to which said first cavity is adjacent.
5. The invention of claim 4 wherein:
   said slide portion has an inner face which is curved concave to fit a reel foot behind the reel foot which is received in said first cavity.
6. The invention of claim 5 wherein:
   the front of said slide is concave to fit around the post of a reel base between front and rear reel feet.
7. The invention of claim 4 wherein:
   said slide portion is made of a resilient material whereby the mating guide means in said slide portion and in said body member can be fitted together by snapping the slide portion into place in said opening.
8. The invention of claim 7 wherein:
   said guide means retain said slide portion in said opening.
9. The invention of claim 8 wherein:
   said body member is made of a single, generally rigid piece of molded plastic material.
10. The invention of claim 6 wherein:
    the inside of said first cavity is convergent to seat the forward reel foot of a T-shaped reel support in said first cavity and
    the inside face of said slide portion is sloped to cooperate with said second cavity to provide a convergent space for the rear foot of the T-shaped reel support.

* * * * *